United States Patent [19]

Kaatze et al.

[11] Patent Number: 4,642,906

[45] Date of Patent: Feb. 17, 1987

[54] METHOD AND APPARATUS FOR ROASTING SMALL QUANTITIES OF COFFEE

[75] Inventors: Michael Kaatze, Tostedt; Dieter Reiff, Tornesch, both of Fed. Rep. of Germany

[73] Assignee: TCHIBO-Frisch-Rost-Kaffee AG, Hamburg, Fed. Rep. of Germany

[21] Appl. No.: 765,209

[22] Filed: Aug. 13, 1985

[30] Foreign Application Priority Data

Aug. 16, 1984 [DE] Fed. Rep. of Germany ....... 3430103

[51] Int. Cl. .................................................. F26B 3/14
[52] U.S. Cl. .......................................... 34/13; 34/56; 34/62; 34/33; 34/168; 34/181; 99/286
[58] Field of Search ...................... 432/81, 85; 99/286; 34/64, 65, 168, 172, 173, 13, 56, 62, 33, 181

[56] References Cited

U.S. PATENT DOCUMENTS 2,060,581 11/1936 Laessig ..................................... 34/65
2,827,845 3/1958 Richeson ................................ 99/286
2,857,683 10/1958 Schytil ..................................... 34/65
3,153,377 10/1964 Bosak ..................................... 99/286
3,964,175 6/1976 Sivetz ....................................... 34/10
4,271,603 6/1981 Moore .................................... 99/286
4,325,191 4/1982 Kumagai et al. ..................... 99/286

Primary Examiner—Larry I. Schwartz
Attorney, Agent, or Firm—Cushman, Darby & Cushman

[57] ABSTRACT

The invention relates to a method for roasting small quantities of coffee, in which the unroasted coffee is fed into a roaster and supplied with hot air via a controlled burner until roasting is completed; after roasting is shut off, the roasted coffee is pre-cooled with water and then removed to a cooling screen and cooled with air. The invention is characterized in that the coffee is fed into the roasting chamber (12) of the roaster, at a readiness temperature ($t_B$) that is kept constant or regulated, after a feed device (80, 81) for the unroasted coffee has been unblocked for further filling, after the removal of the previous batch of roasted and cooled coffee.

8 Claims, 1 Drawing Figure

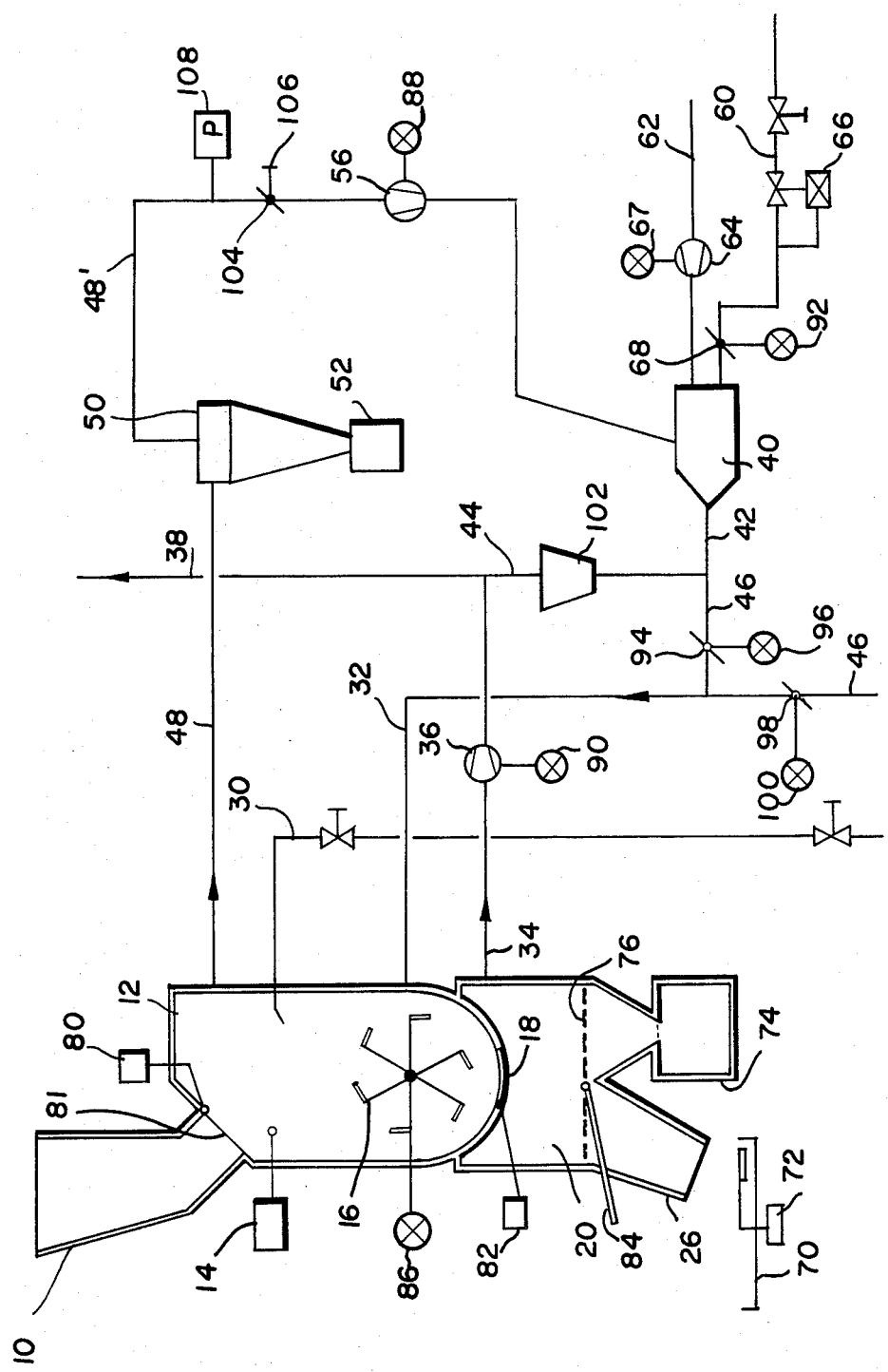

METHOD AND APPARATUS FOR ROASTING SMALL QUANTITIES OF COFFEE

BACKGROUND OF THE INVENTION

The present invention relates to a method for roasting coffee in a small, store-sized roaster, in which the unroasted coffee is placed in a roaster and hot air is supplied via a regulated burner until roasting is complete, and then when roasting is shut off the coffee is precooled with water and then removed to a cooling screen, where it is completely cooled with air. The invention also relates to an apparatus suitable for performing the method.

Methods and apparatus of this kind for intermittent, large-scale coffee roasting are known. However, they require skilled operators who take care to feed in the unroasted coffee and remove the roasted coffee at the proper time, and who decide both when the roasting procedure is complete and what type of cooling to use, for how long, by reason of their considerable experience. Recognizing when roasting is complete is done by a roasting supervisor, who uses empirical values at the end of a timed control period and perhaps also compares the color of the roasted coffee beans.

SUMMARY OF THE INVENTION

The object of the invention is to propose a coffee roasting method and an appropriate apparatus therefor, which make it possible to carry out the coffee roasting in a sales outlet using a small, store-sized roaster, with workers not technically trained, and furthermore to enable optimal, yet simple, roasting of beans from various sources for specific roast types, so that the roasted coffee from the various sources can be prepared in accordance with customers' wishes. Furthermore, the entire process should be controlled in such a way that virtually only a single switch need be actuated in order to set the roasting procedure, from filling to removal, into operation, the course of the roasting itself being adjustable for specific roasts.

It is true that small laboratory roasters are known; however, they, too, can be operated only by skilled workers. Adapting the process of roasting the most various types of coffee, with different roasting temperatures and different cooling times, which requires a great deal of experience and skill, to a method that could be performed by practically any salesperson while precludng errors was heretofore impossible.

To attain the object of the invention, a method in accordance with the main claim and a corresponding apparatus in accordance with claim 5 are proposed. Particularly preferred embodiments of the method and particularly suitable embodiments of the apparatus are described in the dependent claims.

A principle feature of the method according to the invention is that the roasting chamber, whether or not it contains unroasted coffee, is selectively brought to or maintained at a readiness temperature $t_B$ of approximately 220° to 350° C., and preferably 320° C., which after the unroasted coffee is introduced immediately drops sharply, passes through a peak value of the lowest temperature $t_U$ of approximately 120° to 180° C. and during roasting gradually rises to the final roasting temperature $t_E$, of 350° to 380° C., for example, that has been selected for the particular source of the coffee being roasted. When this final roasting temperature is reached, as detected by a temperature sensor, pre-cooling with water is initiated, which is then followed by the air cooling and discharging of the coffee. Although it is somewhat more expensive in terms of energy to maintain the readiness temperature, this provision enables optimal, replicable roasting of the various kinds of coffee as a function of the associated final roasting temperature.

In accordance with the invention, it is also possible for untrained workers to be able to feed the coffee that is to be roasted into the roasting chamber only if the coffee located in the roasting chamber or in the cooling chamber has been removed. This unblocking of the feed hopper takes place only after a corresponding program has elapsed, with which the unblocking signals of the various units are taken into account, such as the feedback of the emptying of the roasting chamber and cooling screen and the indication of the proper operation of the hot air and the system-dependent units.

In both the method and the apparatus according to the invention, a particularly important fact is that when the cooling screen is emptied, the roasted coffee can either be placed on a presentation screen or in a receiving hopper, which is not readily seen by the customer, depending on what is desired. As a result, continuous roasting of batches of coffee is possible during normal store operation, and one of the batches can be placed on the presentation screen only if a customer expresses such an interest.

The small, store-sized roaster according to the invention will now be described in detail, referring to the drawing.

BRIEF DESCRIPTION OF THE DRAWING

The single FIGURE of the drawing is a schematic view of the apparatus according to the invention.

DETAILED DESCRIPTION

In the present example, the small, store-sized roaster comprises a roasting chamber 12, which is provided with a paddle mechanism 16, a feed hopper 10 and a temperature sensor 14, as well as an emptying flap 18. A cooling chamber 20 having a pivotable cooling screen 76 is located below the roasting chamber; when opened, the cooling screen leads into a discharge chute 26.

Leading to the roasting chamber 12 are a line or conduit 32 for hot or fresh air, which is supplied by either a hot-air supply line 42 or a fresh-air line 16, and a cooling-water line 30. A roasting-air vent line 48, 48' leads away from the roasting chamber to a hot-air furnace 40 via an intermediate trap 50 having a receptacle for the skins and fine dust particles arising during roasting, and includes a fan 56. The roasting air is thus circulated, and then reheated as needed.

From the cooling chamber 20, an exhaust line 34 leads via a fan 36 for the cooling air into an exhaust gas line 38, into which a hot-air vent line 44 communicating with the hot-air line 42 also discharges.

The hot-air furnace 40 is supplied via a gas supply line 60 and a burner air line 62 by a corresponding fan 64 for the burner air; this fan 64 is driven by a motor 67. A burner control and monitoring means 66 having monitoring elements serves to assure the desired temperature of the roasting gases and to control a mixing valve 68.

In principle, the structure of this small, stored-sized roaster corresponds to a large-scale roasting system that operates intermittently, in which the unroasted coffee is roasted with hot air that is returned in a circulatory flow to the burner, where it is heated; once roasting has ended, the coffee in the roaster is pre-cooled with water and then completely cooled in the cooling chamber using air. In the small, store-sized roasters according to the invention, the roasting chamber is equipped with a capacity of approximately 2 to 10 kg, and the cooling chamber is provided with a cooling screen surface area of approximately 0.1 to 0.5 m².

Supplementing the thus-modified small, store-sized roaster, there is a filling flap 81 on the input side, at the end of the feed hopper 10, for the sake of better control of the system. The filling flap is actuated electromechanically, and in the present case by a servomotor or a solenoid 80. Analogously, there is an emptying flap 18, actuated by a servomotor or by a solenoid 82, on the discharge side. The cooling screen 76 is opened by means of an operating element 84.

A presentation screen 70, having a motor-driven stirring mechanism 72, is also located beneath the discharge chute 26.

Next to the discharge cute 26, a chute leading to a receiving hopper 74 is provided, which can be opened or closed by means of a trap door 76 in the cooling chamber 20. A plurality of such hoppers can also be provided, being supplied via approximately arranged chutes.

A drive motor 86 for the paddle mechanism 16, a further drive motor 88 for the roasting fan 56 and a drive motor 90 for the cooling fan 36 are also provided, as are a suitable servomotor 92 for the mixing valve 68 of the burner and a controllable supply valve 94 for the hot-air line 42 having a suitable solenoid or servomotor 96. Analogously, a supply valve 98 for the fresh air is provided in the fresh-air line 46. Between the hot-air line 42 and the vent pipe 38, there is a chamber 102, filled with a catalyst and/or absorbents, for cleaning the exhaust air.

A throttle valve 104 for the hot air, which may be adjustable either manually or by motor, is located in the roasting-air return line 48' upstream of the burner, and a pressure monitor 108 for the hot air is located upstream of this throttle valve.

With these supplementary units, which are designed for the operation of a small, store-sized roaster, the roasting method according to the invention can be performed even with untrained operators, and the coffee is roasted to a replicable, uniform quality in accordance with the various types.

As a result of the filling flap 81 controlled by a servomotor or solenoid 80, it is not possible to feed unroasted coffee into the roaster until the roasting chamber 12 has been emptied and the emptying flap 18 has been closed. This is effected by interlinking the electrical circuits for the various solenoids or servomotors so that they will operate in a pre-planned sequence. This avoids the possibility that careless operators may add a further batch of unroasted coffee to the roasting chamber while it is in operation, or overload it.

The appropriately cooled coffee located on the cooling screen 76 is emptied into the discharge chute, after the cooling process has ended, by the actuation of the operating element 84 and from there is removed to a presentation screen 70; on the presentation screen 70, the freshly roasted coffee can also be well mixed, using the stirring mechanism 72.

One or more receiving hoppers 74, which are disposed below the cooling screen 76, serve either to receive likewise reshly roasted coffee, which for whatever reasons, for instance if the presentation screen 70 has not yet been emptied, is to be stored in some other container, or to receive unwanted roasted material, which can optionally also be removed by suction.

The drive means 86, 88, 90 provided for the paddle mechanism 16, roasting fan 56 and cooling fan 36, respectively, as well as the servomotors or solenoids 92, 96 and 100 for the burner mixing valve 68, the hot air supply valve 94 or the fresh-air supply valve 98, or for the throttle valve 104 for the hot air, and the motor 67 for the fan 64 are actuated by a pre-programmed control means, which is useful when operation is to be performed by untrained persons.

This control is preferably effected in accordance with a function plan described as follows.

In the outset position, after a main switch is turned on, all the drive mechanisms are in readiness; the operating lever 84 for the cooling screen 76 is actuated, and the feedback of "empty" is confirmed. When this signal is received, the emptying flap 18 opens once, and then closes again. After these situations are indicated—that is, that the emptying flap 18 is closed and the cooling screen 76 is empty—the paddle mechanism 16, the roasting fan 56 and the cooling fan 36 are switched on in order to operate the roaster, whereupon the preparation phase for the burner has been reached. The burner regulator 66 is set to a zero value; the hot-air supply valve 94 and the fresh-air supply valve 98 are set at the flushing position by the corresponding servomotors 96 and 100; and then the switching program for burner regulation is triggered, by unblocking the supply of gas via the line 60 and igniting the burner, and by moving the hot-air supply valve 94 and the fresh-air supply valve 98 to the operating position.

After appropriate indication of the unroasted coffee located before the filling flap 81 and after the filling or readiness temperature is reached, the filling flap is triggered via the servomotor or solenoid 80 and then closed again; this may be indicated by a visual signal. After the final roasting temperature has been reached, the supply of hot air is shut off automatically via a signal received by the heat sensor 14, and cooling water is delivered to the roasting chamber via the cooling-water line 30, a procedure that can be selectively controlled in accordance with either quantity or time; at the same time, the hot-air supply valve 94 is closed by the servomotor 96. After the quantity or time control for the supply of cooling water has elapsed, the opening of the emptying flap 18 into the cooling chamber 20 is triggered automatically upon receipt of a visual or acoustical control signal. After a time-controlled cooling with air, the cooling screen 76 if tipped manually or automatically so as to empty it, again via an acoustical or visual signal; the stirring mechanism 72 for the presentation screen 70 either switches on automatically or runs permanently when the rest of the system is in operation. Depending on the quantity present, or on how busy the store is, the flap 76 for the receiving hopper 74 can be triggered instead. Once the roasted coffee is removed, the system automatically returns to its state of readiness.

What is claimed is:

1. In a method for roasting small quantities of coffee beans in an apparatus including a roasting chamber having means for controlling the temperature thereof, means for filling beans into the chamber, means for detecting the temperature in the chamber, means for actuating the filling means when the temperature in the chamber reaches a predetermined level within the range of 220 to 350 degrees C., cooling means and means for discharging the roasted beans to a cooling screen, the steps comprising:

selecting a desired temperature level for the chamber corresponding to the beans to be roasted, feeding the coffee beans into the roasting chamber when the selected temperature level in the chamber of between 220 and 350 degrees C. has been reached, allowing the beans to reach a first predetermined temperature and then a second temperature correlated to the particular type of coffee bean disposed in the chamber with said first temperature being lower than said second temperature, stopping the roasting by adding water to the chamber upon detection of the second temperature to carry out a first cooling of the beans, then discharging the cooled beans to a movable cooling screen disposed in an adjacent cooling chamber and further cooling the beans in the cooling chamber.

2. The method as claimed in claim 1, wherein, after the further cooling of the beans in the cooling chamber, the method includes the step of discharging the beans from the cooling chamber to a viewing screen.

3. The method as claimed in claim 1, including the step of tilting said movable screen to effect the discharging of the beans from said cooling chamber.

4. The method as claimed in claim 1, including the step of, after discharge of the beans from the cooling chamber, supplying hot air to said roasting chamber to raise the temperature thereof to the selected temperature.

5. An apparatus for processing coffee beans comprising a roasting chamber having a stirring means, means for detecting a selected temperature and a discharge means for emptying the contents of said roasting chamber into a cooling chamber, said cooling chamber having a cooling screen movable between a first position where beans are retained thereon and a second position where beans are discharged therefrom under gravity flow to a discharge chute, said apparatus further including a feed hopper having a feed opening leading to said roasting chamber and movable door means controlling flow through said feed opening, control means for opening and closing said door means with said control means being actuatable to open said door means after said discharge means empties said roasting chamber and said cooling screen is moved to said second position and when said temperature detection means detects said selected temperature.

6. The apparatus as claimed in claim 5, wherein a viewing screen is disposed to receive beans from said discharge chute for presenting the beans to a viewer.

7. The apparatus as claimed in claim 6, wherein a receiving hopper is provided and said cooling screen is pivotable to discharge beans to one of said discharge chute and said receiving hopper.

8. The method as claimed in claim 7, wherein the apparatus includes means for preventing actuation of the filling means when beans are present in said roasting chamber and means for detecting the absence of beans in the roasting chamber and the method includes the steps of detecting the absence of beans in the roasting chamber and disabling said preventing means.

* * * * *